United States Patent
Ueda et al.

(10) Patent No.: US 6,605,387 B1
(45) Date of Patent: Aug. 12, 2003

(54) ALKALINE STORAGE BATTERY

(75) Inventors: Toshifumi Ueda, Toyohashi (JP); Nobuyasu Morishita, Toyohashi (JP); Noriyuki Fujioka, Kosai (JP); Munehisa Ikoma, Toyohashi (JP)

(73) Assignees: Matsushita Electric Industrial Co., Ltd., Osaka (JP); Toyota Jidosha Kabushiki Kaisha, Aichi-Ken (JP)

( * ) Notice: Subject to any disclaimer, the term of this patent is extended or adjusted under 35 U.S.C. 154(b) by 203 days.

(21) Appl. No.: 09/704,047

(22) Filed: Nov. 2, 2000

(30) Foreign Application Priority Data

Nov. 4, 1999 (JP) .......................................... 11-314053

(51) Int. Cl.[7] ............................. H01M 4/38; H01M 4/58
(52) U.S. Cl. ................................................... 429/218.2
(58) Field of Search ................................ 429/10, 218.2

(56) References Cited

U.S. PATENT DOCUMENTS 5,376,474 A  * 12/1994 Tadokoro et al. .... 429/218.2 X
6,071,644 A  *  6/2000 Ikemachi et al. ........ 429/218.2
6,238,823 B1 *  5/2001 Reilly et al. ............. 429/218.2

FOREIGN PATENT DOCUMENTS

| EP | 0 271 043 | 6/1988 | .......... H01M/10/34 |
| EP | 0 793 284 | 9/1997 | ............ H01M/4/38 |
| EP | 843371 | * 5/1998 | ............ H01M/4/38 |
| EP | 0 944 124 | 9/1999 | ............ H01M/4/38 |
| EP | 0 986 119 | 3/2000 | ............ H01M/4/38 |
| JP | 63-146353 | 6/1988 | |
| JP | 1-239454 | 9/1989 | |
| JP | 2-267872 | 11/1990 | |
| JP | 4-137361 | 5/1992 | |
| JP | 11-222601 | * 8/1999 | ............ H01M/4/38 |

* cited by examiner

Primary Examiner—Stephen Kalafut
(74) Attorney, Agent, or Firm—McDermott, Will & Emery

(57) ABSTRACT

An alkaline storage battery of the present invention has a negative electrode comprising an $AB_5$ type hydrogen storage alloy containing at least nickel as B element. The hydrogen storage alloy contains 1.5 to 5.0% by weight of a magnetic substance comprising metallic nickel. The above-mentioned alkaline storage battery can effect high output from the initial stage of charging and discharging cycles.

5 Claims, 1 Drawing Sheet

ALKALINE STORAGE BATTERY

BACKGROUND OF THE INVENTION

The present invention relates to an alkaline storage battery having a negative electrode comprising an $AB_5$ type hydrogen storage alloy.

As a typical example of an alkaline storage battery having a negative electrode comprising a hydrogen storage alloy which can absorb and desorb hydrogen reversibly, there is a nickel-metal hydride storage battery having a positive electrode comprising nickel hydroxide. The nickel-metal hydride storage battery is widely used as a power source of portable instruments such as a cellular phone, personal computer, power tool and the like. Recently, as a main power source of an electric vehicle and the like, practical use of a nickel-metal hydride storage battery has been developed. Thus, a nickel-metal hydride storage battery is often used at high output. Therefore, further improvement in discharging property at a large current (high-rate discharging property) is required for a nickel-metal hydride storage battery.

However, an alkaline storage battery having a negative electrode comprising a hydrogen storage alloy has a problem that high-rate discharging property tends to be insufficient at the initial charging and discharging cycles.

Conventionally, the following improvements of negative electrodes have been tried.

Japanese Laid-Open Patent Sho 63-146353 suggests a method in which a hydrogen storage alloy powder is immersed in an aqueous alkaline solution having a specific gravity of 1.1 or more at temperatures in a range of 45 to 100° C. for 0.2 to 24 hours. When a hydrogen storage alloy powder which had been subjected to such a treatment is used in a negative electrode, a discharging capacity obtained in a cycle of charging and discharging at the initial stage can be maintained even after the cycle is repeated 200 times or more.

Japanese Laid-Open Patent Hei 2-267872 suggests that it be effective to conduct a formation treatment at least once after assembly of a battery. The treatment has a process of charging the battery and a process of discharging the charged battery at a higher temperature than in the charging process. When such a formation treatment is performed, low-rate discharging property of a battery is increased.

Japanese Laid-Open Patent Hei 4-137361 suggests that metallic nickel and cobalt, and an oxide of at least one constituent element of a hydrogen storage alloy are allowed to exist in admixture on the surface of the hydrogen storage alloy. Such a surface condition of a hydrogen storage alloy is obtained, for example, by immersing a hydrogen storage alloy powder into an aqueous alkaline solution. For example, when metallic nickel and metallic cobalt in a total amount corresponding to a magnetization strength of 0.005 to 12 emu/g are contained in a hydrogen storage alloy, the increase of inner pressure of a battery due to generation of hydrogen gas is suppressed, leading to an improvement of cycle life of the battery.

Though any of the above-mentioned battery having a negative electrode comprising a hydrogen storage alloy is improved in cycle life or low-rate discharging property, a battery which can manifest an excellent high-rate discharging property at the initial charging and discharging cycles has not been provided.

The object of the present invention is to provide a high output alkaline storage battery which can manifest an excellent high-rate discharging property, particullarly at the initial charging and discharging cycles.

BRIEF SUMMARY OF THE INVENTION

The present invention relates to an alkaline storage battery comprising a positive electrode, a negative electrode, and an alkaline electrolyte, said negative electrode comprising an $AB_5$ type hydrogen storage alloy containing at least nickel as B element, wherein the hydrogen storage alloy contains 1.5 to 5.0% by weight, preferably 2.0 to 4.0% by weight of a magnetic substance comprising metallic nickel.

The hydrogen storage alloy preferably contains 45 to 55% by weight of nickel as B element.

It is preferable that the specific surface area of the hydrogen storage alloy is in a range of 0.2 to 5.0 $m^2/g$, further 0.4 to 4.0 $m^2/g$.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
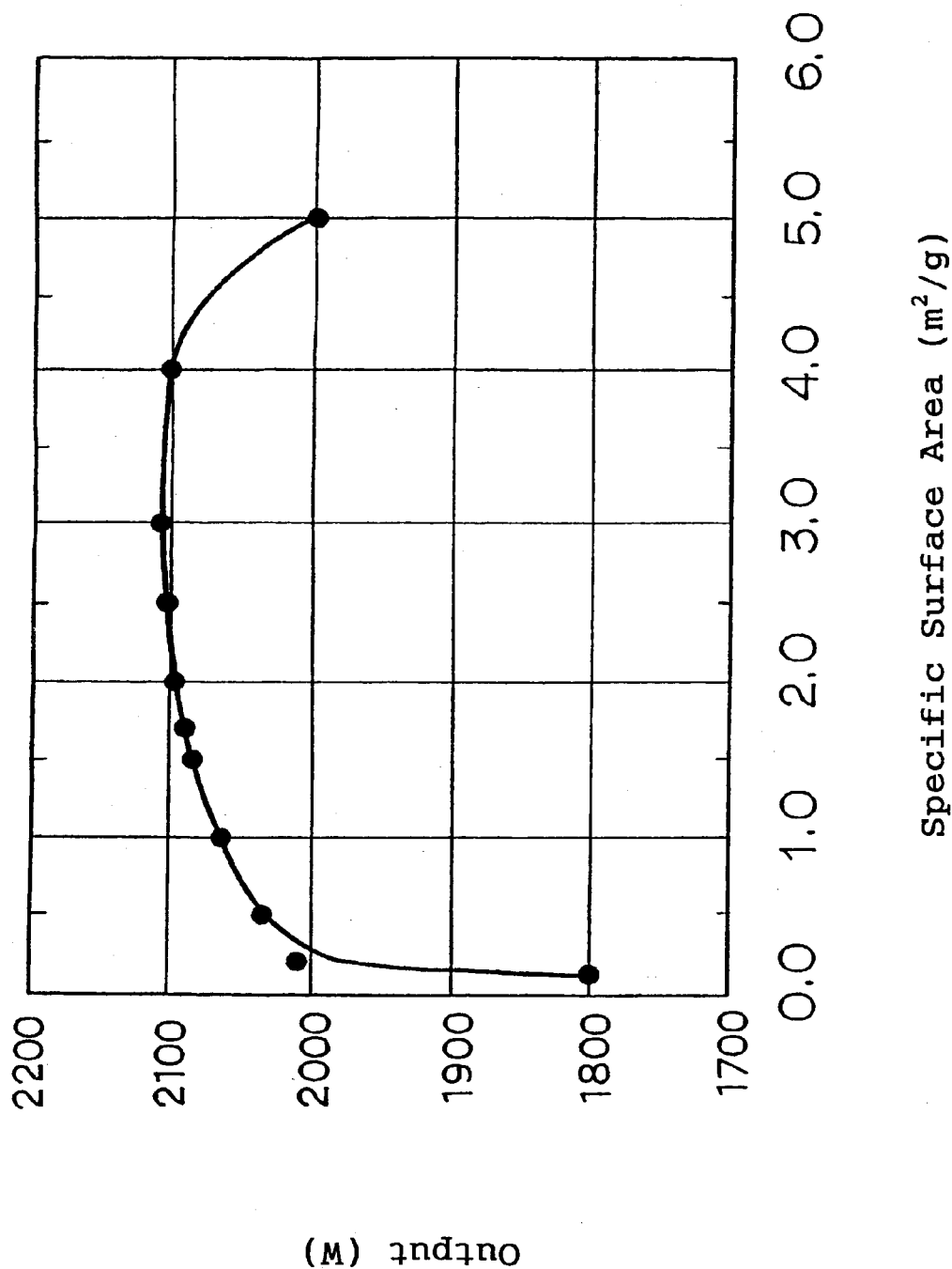
FIG. 1 is a view showing a relation between the output of a module carrying a nickel-metal hydride storage battery of the present invention and the specific surface area of a hydrogen storage alloy powder.

The hydrogen storage alloy contained in a negative electrode of an alkaline storage battery includes an $AB_5$ type, $AB_2$ type and AB type alloys and the like. Among them, the $AB_5$ type hydrogen storage alloy is stable in an alkaline electrolyte and, therefore, widely used in negative electrodes comprising hydrogen storage alloys.

The $AB_5$ type hydrogen storage alloy is typified by $LaNi_5$, and the molar ratio of A element and B element contained in an $AB_5$ type alloy is approximately 1:5. The A element has a high affinity for hydrogen, and the B element has a low affinity for hydrogen.

As the A element in an $AB_5$ type alloy, La or an alloy (Misch metal) composed mainly of rare earth elements such as La, Ce or the like are general, and a part of these elements may be substituted by Ti, Zr, Ca and the like. As the B element, Ni is general, and a part of Ni may be substituted by Co, Mn, Al, Fe, Cu, Cr and the like.

A hydrogen storage alloy absorbs hydrogen in charging, and desorbs hydrogen in discharging. Therefore, in a negative electrode comprising a hydrogen storage alloy powder which has not been subjected to a specific treatment or a hydrogen storage alloy powder having an oxide layer on the surface thereof, absorption and desorption of hydrogen by the alloy are not effected smoothly. Particularly, a sufficient high-rate discharging property is not obtained at the initial charging and discharging cycles of a battery having such a negative electrode. Then, in the present invention, a hydrogen storage alloy in which mainly surface portion thereof is modified to be adequate condition is used. Namely, a magnetic substance comprising metallic nickel is allowed to deposit in an appropriate amount on the surface of a hydrogen storage alloy. Metallic nickel manifests a strong magnetization, and consequently, has a strong catalytic activity which activates an electrochemical reaction accompanied with absorption and desorption of hydrogen.

However, it is considered that when a magnetic substance comprising metallic nickel is present excessively on the surface of the alloy, this prevents desorption of hydrogen from inside of the hydrogen storage alloy, delaying the discharging reaction of a battery. When the amount of a magnetic substance comprising metallic nickel is insufficient, on the other hand, an effect to enhance the electrochemical activity of a hydrogen storage alloy is not obtained sufficiently, and a discharging reaction in which hydrogen changes to hydrogen ions is delayed.

When the amount of the magnetic substance comprising metallic nickel is excessively large or small, high-rate discharging property is-not satisfactory at the initial charging and discharging cycles. Therefore, it is necessary that a magnetic substance comprising metallic nickel is contained in the hydrogen storage alloy in an amount of 1.5 to 5.0% by weight, preferably of 2.0 to 4.0% by weight.

As the methods to deposit a magnetic substance comprising metallic nickel in the suitable amount on the surface of a hydrogen storage alloy, there can be applicable, for example, a method in which a hydrogen storage alloy having a mean particle size of 10 to 40 am containing nickel is immersed in an aqueous alkaline solution having a specific gravity of 1.0 or more at 100 to 150° C. for 0.2 to 24 hours, or a method in which a negative electrode comprising a hydrogen storage alloy containing nickel or a nickel-metal hydride storage battery having this negative electrode is subjected to a formation treatment. In these methods, among the constituent elements of the hydrogen storage alloy, rare earth elements, Al, Ca and the like which tend to dissolve relatively easily into an aqueous alkaline solution are dissolved into the aqueous alkaline solution or alkaline electrolyte. At the same time, Ni which is a main component and Co which is a minor component of the alloy deposit in a metal state on the surface of the hydrogen storage alloy.

Herein, the formation treatment indicates repetition of a cycle in which discharging is conducted at a current of 5 to 200 A at 0 to 50° C. after charging is conducted at a current of 5 to 200 A at 0 to 50° C.

As a quantifying method of metallic nickel, Japanese Patent No. 2553616 suggests a simple method. In this method, a magnetic field of a strength of 10000 to 20000 Oe (oersted) is applied on a sample containing metallic nickel, and saturation magnetization of this sample is measured. Since the saturation magnetization is proportional to the content of metallic nickel in the sample, the content of metallic nickel in the sample can be quantified based on the saturation magnetization. Since a hydrogen storage alloy used in a negative electrode of an alkaline storage battery is composed mainly of Ni, the amount of a magnetic substance comprising metallic nickel may be quantified according to the method described in the above-mentioned publication.

In depositing a magnetic substance comprising metallic nickel in the suitable amount on the surface of a hydrogen storage alloy, metals other than Ni contained in the hydrogen storage alloy as described above such as Co, also deposit in a slight amount. Further, these metals also manifest strong magnetization. Therefore, in the quantifying method described in the above-mentioned publication, the total of the saturation magnetization of metallic nickel and the saturation magnetization of other magnetic substance is measured.

Therefore, in the present invention, the simulative amount of metallic nickel is quantified supposing that the measured saturation magnetization is wholly based on metallic nickel, and this simulative amount of metallic nickel is defined as the amount of a magnetic substance comprising metallic nickel.

For obtaining an alkaline storage battery which can manifest high output even at low temperatures, it is preferable to use a hydrogen storage alloy having a specific surface area of 0.2 to 5.0 m$^2$/g.

Next, the present invention will be illustrated concretely based on examples.

EXAMPLE 1

A hydrogen storage alloy powder having a composition of $MmNi_{3.55}Co_{0.75}Mn_{0.4}Al_{0.3}$ was prepared as described below. Herein, Mm is a Misch metal composed of 45% by weight of Ce, 30% by weight of La, 5% by weight of Nd and 20% by weight of other rare earth elements.

First, raw material metals were put in an arc fusion furnace in a proportion corresponding to the above-described composition, and the pressure of inside of the furnace was reduced to 0.0133 to 0.00133 Pa ($10^{-4}$ to $10^{-5}$ Torr). Then, the atmosphere in the furnace was substituted with an argon gas. The raw material metals were heated to fusion by arc discharge while turning over the furnace. Subsequently, the melted substance was heated for 8 hours at 1050° C. under the argon gas atmosphere, then, cooled to obtain a hydrogen storage alloy having the above-mentioned composition. This alloy was ground in a ball mill to give a powder having a particle size of 38 $\mu$m or less.

Then, to deposit a magnetic substance comprising metallic nickel on the surface of the resulted hydrogen storage alloy powder, the alloy powder was immersed for 6 to 20 hours in an aqueous KOH solution having a specific gravity of 1.30 which had been heated to temperatures from 100 to 120° C. shown in Table 1, then, washed with water and dried. The dried alloy powder was mixed with an aqueous solution containing 5% by weight of polyvinyl alcohol, and the mixture was kneaded to give a paste. This paste was applied on a substrate made of a punched metal, dried, and pressed to obtain a negative electrode comprising the hydrogen storage alloy.

A prismatic cell was manufactured having a nominal capacity of 95 Ah using the resulted negative electrode. The positive electrode of the cell was obtained by filling a paste comprising nickel hydroxide into a substrate made of a foamed nickel sheet by an ordinary method, and drying and pressing it. As a separator, polyamide non-woven fabric which had been subjected to a treatment to introduce sulfonic acid groups was used. An electrolyte was used which was prepared by dissolving LiOH at a concentration of 40 g/liter into an aqueous KOH solution having a specific gravity of 1.30. Ten prismatic cells described above were connected in series to obtain a module of the nickel-metal hydride storage battery.

Charging of the resulted module was conducted at a current of 19 A for 5 hours, then, the high-rate discharging property at a low temperature was evaluated. Namely, the module was discharged at −10° C. for 10 seconds at a current of 20 A, 100 A, 200 A or 300 A, and the closed circuit voltage was measured at each discharging. The relation between the respective discharge currents (I) and the closed circuit voltages was plotted. A current value when the closed circuit voltage reaches 10 V was read from the approximation line. This current value was multiplied by 10 V to give the output (W) of the module.

The negative electrode was taken out from the cell after evaluation, and the hydrogen storage alloy powder was shaved from this negative electrode, washed with pure water, and the amount of the magnetic substance comprising metallic nickel was measured by the above-mentioned method. The results are shown in Table 1.

TABLE 1

| Temperature (° C.) | Time (hr) | Output (W) | Amount of Magnetic Substance (wt %) |
|---|---|---|---|
| 100 | 6 | 1900 | 1.0 |
| 102 | 6 | 2018 | 1.5 |
| 104 | 6 | 2035 | 1.8 |
| 106 | 6 | 2067 | 2.0 |
| 108 | 6 | 2089 | 2.5 |
| 110 | 6 | 2100 | 3.2 |
| 112 | 6 | 2090 | 3.3 |
| 114 | 6 | 2082 | 3.4 |
| 116 | 6 | 2075 | 3.6 |
| 118 | 6 | 2065 | 3.9 |
| 120 | 6 | 2060 | 4.0 |
| 120 | 8 | 2045 | 4.3 |
| 120 | 15 | 2023 | 4.7 |
| 120 | 15 | 2005 | 5.0 |
| 120 | 20 | 1950 | 5.3 |

As shown in Table 1, when the treatment temperature of the hydrogen storage alloy powder is higher and the treatment time is longer, the amount of a magnetic substance comprising metallic nickel is increased. High output over 2000 W is obtained when the amount of the magnetic substance is in the range of 1.5 to 5.0% by weight. Particularly, when the amount of the magnetic substance is in the range of 2.0 to 4.0% by weight, further higher output is obtained.

EXAMPLE 2

A hydrogen storage alloy was produced in the same manner as in Example 1, and ground in a ball mill. Then, the hydrogen storage alloy powder after grinding was directly immersed in an aqueous KOH solution having a specific gravity of 1.30 for 6 hours, then, washed with water and dried. Using the dried alloy powder, a negative electrode and then a prismatic cell were manufactured. A module was fabricated in the same manner as in Example 1.

Then, the formation treatment of the resulted module was conducted predetermined times shown in Table 2 (5 to 60 times). In the formation treatment, charging of the module was conducted at a current of 19 A for 5 hours, and discharging was conducted until the battery voltage reached 10 V at a current of 47.5 A.

Charging of the module after the formation treatment was conducted at a current of 19 A for 5 hours, then, output of the module was measured in the same manner as in Example 1. The negative electrode was taken out from the cell after evaluation, and a hydrogen storage alloy powder was shaved from this negative electrode, washed with pure water. Then, the amount of the magnetic substance comprising metallic nickel was measured by the above-mentioned method. The results are shown in Table 2.

TABLE 2

| Number of Treatment | Output (W) | Amount of Magnetic Substance (wt %) |
|---|---|---|
| 5 | 1500 | 0.8 |
| 8 | 2015 | 1.5 |

TABLE 2-continued

| Number of Treatment | Output (W) | Amount of Magnetic Substance (wt %) |
|---|---|---|
| 10 | 2060 | 2.0 |
| 20 | 2085 | 2.5 |
| 30 | 2095 | 3.3 |
| 40 | 2070 | 4.0 |
| 50 | 2048 | 4.4 |
| 60 | 2045 | 4.5 |

As shown in Table 2, when the formation treatment is repeated 8 times or more, output of the module is increased. When the number of the formation treatment is larger, the amount of the magnetic substance comprising metallic nickel tends to be increased. When the formation treatment is repeated 8 to 60 times, the amount of the magnetic substance comprising metallic nickel is in a large of 1.5 to 4.5% by weight. However, even if the formation treatment is repeated 50 times or more, the amount of the magnetic substance comprising metallic nickel and the output of the module are scarcely changed.

Particularly, when the formation treatment is repeated 10 to 40 times, a remarkable effect of increase in output of the module is recognized. In this case, the amount of the magnetic substance comprising metallic nickel is in a range of 2.0 to 4.0% by weight. When the treatment is conducted 30 times, the module manifests highest output, therefore, the number of the formation treatment is preferably 8 to 30.

EXAMPLE 3

A hydrogen storage alloy was produced in the same manner as in Example 1, and hydrogen storage alloy powders having different mean particle sizes were obtained by changing the grinding condition. The hydrogen storage alloy powder was immersed in an aqueous KOH soution having a specific gravity of 1.30 at 70° C. for 6 hours, then, washed with water and dried. The specific surface area of the hydrogen storage alloy powder after drying was measured by BET method using a nitrogen gas. Further, the module was fabricated in the same manner as in Example 1 using the hydrogen storage alloy powder after drying. For this module, the formation treatment under the same condition as in Example 2 was conducted 30 times.

Charging of the module after the formation treatment was conducted at a room temperature at a current of 19 A for 5 hours, then, output of the module was measured in the same manner as in Example 1. The relation between the output of the module and the specific surface area of the alloy is shown in FIG. 1.

From FIG. 1, it may be said preferable to use a hydrogen storage alloy powder having a specific surface area in a range of 0.2 to 5.0 $m^2/g$ for obtaining a high output nickel-metal hydride storage battery.

From the above-mentioned examples, according to the present invention, an alkaline storage battery effecting an excellent performance which manifests high output even at the initial charging and discharging cycles can be provided. Further, an alkaline storage battery effecting a further excellent performance can be provided when the specific surface area of the hydrogen storage alloy powder is in a range of 0.2 to 5.0 $m^2/g$.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An alkaline storage battery comprising a positive electrode, a negative electrode, and an alkaline electrolyte, said negative electrode comprising an $AB_5$ type hydrogen storage alloy comprising nickel as B element, wherein said hydrogen storage alloy contains 1.5 to 5.0% by weight of a magnetic substance comprising metallic nickel deposited on a surface of said hydrogen storage alloy.

2. The alkaline storage battery in accordance with claim 1, wherein said hydrogen storage alloy contains 45 to 55% by weight of nickel as B element.

3. The alkaline storage battery in accordance with claim 1, wherein said hydrogen storage alloy contains 2.0 to 4.0% by weight of a magnetic substance comprising metallic nickel deposited on the surface of said hydrogen storage alloy.

4. The alkaline storage battery in accordance with claim 1, wherein a specific surface area of said hydrogen storage alloy is in a range of 0.2 to 5.0 $m^2/g$.

5. The alkaline storage battery in accordance with claim 1 wherein said hydrogen storage alloy has a specific surface area in the range of from 1.0 to 5.0 $m^2/g$.

* * * * *